United States Patent
Reutlinger

(10) Patent No.: US 6,703,756 B2
(45) Date of Patent: Mar. 9, 2004

(54) ELECTRICAL MACHINE

(75) Inventor: Kurt Reutlinger, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/130,521

(22) PCT Filed: Sep. 21, 2001

(86) PCT No.: PCT/DE01/03650

§ 371 (c)(1),
(2), (4) Date: May 20, 2002

(87) PCT Pub. No.: WO02/25796

PCT Pub. Date: Mar. 28, 2002

(65) Prior Publication Data

US 2002/0190587 A1 Dec. 19, 2002

(30) Foreign Application Priority Data

Sep. 21, 2000 (DE) .......................... 100 47 108

(51) Int. Cl.$^7$ ................................ H02K 5/24
(52) U.S. Cl. .................. 310/254; 310/261; 310/156.01
(58) Field of Search .................. 310/254, 257–259, 310/261, 166, 156.43, 156.44, 156.45, 156.48, 156.01

(56) References Cited

U.S. PATENT DOCUMENTS

| | | | | |
|---|---|---|---|---|
| 5,220,228 A | * | 6/1993 | Sibata ........................ | 310/254 |
| 5,304,882 A | | 4/1994 | Lipo et al. .................. | 310/156 |
| 5,418,414 A | * | 5/1995 | Ackermann et al. ... | 310/156.43 |
| 5,825,113 A | | 10/1998 | Lipo et al. .................. | 310/181 |
| 5,874,795 A | * | 2/1999 | Sakamoto .............. | 310/156.12 |
| 6,008,614 A | | 12/1999 | Imai ............................ | 318/700 |
| 6,028,385 A | * | 2/2000 | Pengov et al. ............. | 310/166 |
| 6,075,302 A | * | 6/2000 | McCleer ..................... | 310/166 |
| 6,078,122 A | * | 6/2000 | Tang et al. ................. | 310/165 |
| 6,114,789 A | * | 9/2000 | Pengov et al. ............. | 310/166 |
| 6,163,128 A | | 12/2000 | Hiti et al. ................... | 318/722 |

FOREIGN PATENT DOCUMENTS

| | | |
|---|---|---|
| DE | 199 20 309 A | 11/1999 |
| EP | 0 638 457 A | 2/1995 |
| EP | 1 014 542 A | 6/2000 |

* cited by examiner

Primary Examiner—Dang Le
Assistant Examiner—Leda T. Pham
(74) Attorney, Agent, or Firm—Michael J. Striker

(57) ABSTRACT

An electrical machine, in particular a starter-generator, having a permanent-magnetically excitable rotor (19) and a stator (16), the stator (16) carrying a multiphase winding (38) is proposed, having an inverter (22) which is variable by means of a regulating or control device (23) and by which the stator (16) can be operated in the field attenuation mode; the rotor (19) has a number of teeth equivalent to n times the number of phases of the multiphase winding (38) in the stator (16), and each phase winding (36) comprises at least one coil (34), and all the coils (34) of the multiphase winding (38) are disposed side by side in the stator (16), and the rotor (19) has a number of poles equivalent to n times the number 4, one pole (32) of the stator (16) having a maximum width of a pole pitch (Tp), and the spacing (A) of two poles (32) of the stator (16) being equivalent to at least one-third the pole pitch (Tp).

8 Claims, 3 Drawing Sheets

ELECTRICAL MACHINE

BACKGROUND OF THE INVENTION

The invention relates to an electrical machine. From U.S. Pat. No. 6,163,128, a method for triggering electrical machines is known, by which electrical machines can be operated in the field attenuation mode. This reference does disclose that synchronous machines with a permanent-magnetically excitable rotor and a stator winding can be triggered in this way. However, further details of the electrical machine are not disclosed.

SUMMARY OF THE INVENTION

The electrical machine of the invention has the advantage that because of the special embodiment of the stator, the primary-field inductance is especially high and is therefore especially well suited for a field attenuation mode. With this winding geometry, the short-circuit current can be reduced so far that It is on the order of magnitude of the rated current end thus makes a theoretically infinite field attenuation range possible. The zero inductance of the machine becomes vanishingly small in this arrangement.

To enable a tooth of the stator to utilize the full flux of a permanent magnet or of the rotor, it is provided that the coil width of one coil be no greater than one pole pitch.

In principle, open slots with a minimum opening of one-third of the pole pitch are then present. As a result, either the winding technology is simplified, or prefabricated coils can be inserted into the open slots.

By the provisions recited in the dependent claims, advantageous refinements of the electrical machine of the main claim are possible.

The field-oriented regulation means that the machine is given the especially favorable performance—and in particular the regulability—of a direct-current machine. As a result, the field-forming longitudinal current and the torque-forming transverse current can be regulated separately from one another, and the machine can no longer tilt.

In permanently excited machines, in the fundamental rpm range the longitudinal current in the machine is regulated to zero. As a result, the machine generates the required torque at the minimum current and thus with the least machine losses.

As a result of the field attenuation mode, the electrical machine is possible above an rpm at which the terminal voltage of the machine reaches the maximum value of the inverter voltage.

By providing one coil side in each slot with otherwise the same dimensions, the inductance of the machine can be increased further, so that a lower field attenuation current is needed, and as a result the load on the machine drops.

If a coolant medium is passed through at least one slot, the result is especially good, effective cooling of the coils. Especially effective cooling is attained if cooling conduits for coolant fluid are accommodated here, which by direct or indirect contact with the copper conductors dissipate the heat directly.

If the machine is embodied such that an air gap between the rotor and one tooth of the stator is widened in the direction of the peripheral ends of the tooth, then the resting moment between the rotor and the stator is reduced. As a result of the resting moment, the torque course between the rotor and the stator is uneven, resulting in low-frequency oscillations that cause vibration of the electrical machine and adjacent components. Accordingly, reducing the resting moment leads to an improvement in travel comfort and a smoother torque course. Furthermore, however, the reduced resting moment prevents high-frequency oscillations and attendant noises. If the tooth width of an individual tooth of the stator is embodied in the circumferential direction with between two-thirds of a pole pitch and one full pole pitch, then by way of this provision the resting moment, with its attendant disadvantages, is avoided.

BRIEF DESCRIPTION OF THE DRAWINGS

In the drawings, exemplary embodiments of the electrical machine of the invention are shown.

DESCRIPTION OF THE PREFERRED EMBODIMENTS

Figure 1:
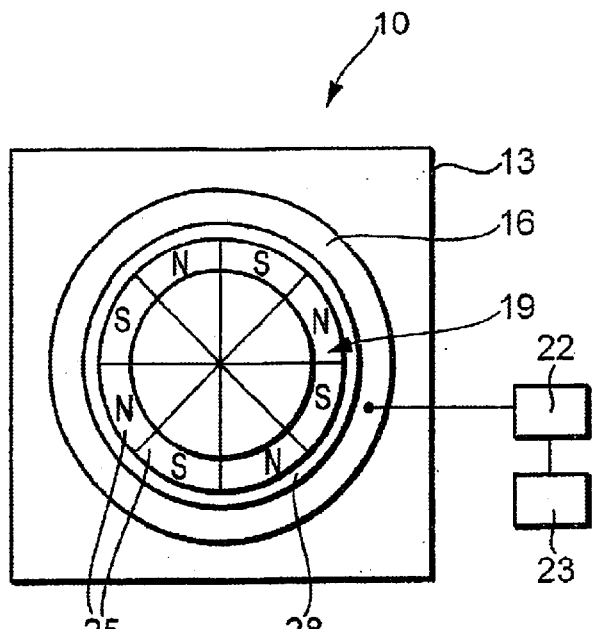
FIG. 1 is a schematic elevation view of the electrical machine.

In FIG. 1, an electrical machine 10 is shown, which in a housing 13 has a stator 16. A permanent-magnetically excitable rotor 19 is disposed inside the stator 16. The stator is triggerable or regulatable by an inverter 22, which in turn can be varied by means of a control or regulating device (23). The rotor 9 has a plurality of permanent magnets 25 on its circumference; the permanent magnets 25 are disposed such that north poles and south poles alternate on the surface of the rotor 19 oriented toward the stator 16. Between the cylindrical surface of the rotor 19 and the surface of the stator 16, there is an air gap 28.

Figure 2:
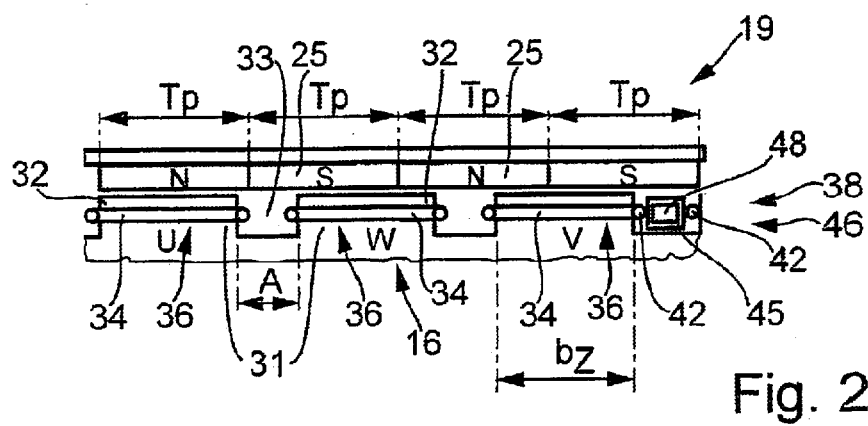
FIG. 2 shows a first exemplary embodiment of the disposition of the coils in the stator.

FIG. 2 shows an extended view, that is, a developed view of the regions oriented toward one another of the rotor 19 and stator 16. In this exemplary embodiment, four poles of the rotor 19, formed by the permanent magnets 25, and poles 32 of the stator 16 that are formed by three teeth 31 face one another. Each of the three teeth 31 carries one coil 34 of a phase winding 36. All three phase windings 36 together form a multiphase winding 38, which in this case represents a three-phase winding. The phase windings 36 have the usual designations for a three-phase winding, that is, U, W and V. In this example, two coil sides 42 of coils 34 of a different phase are disposed in each slot 33.

One tooth width $b_z$ in this example is somewhat smaller than one pole pitch Tp. The spacing A between two teeth 31 is accordingly somewhat greater than one-third of one pole pitch Tp.

In general terms, the stator 16 of the electrical machine 10 has a number of teeth equivalent to n times the number of phases of a multiphase winding 38 in the stator 16. Each phase winding 36 comprises at least one coil 34, and the coils are disposed side by side in the stator 16. The rotor 19 has a number of teeth equivalent n times the number 4. Here, n is an integral number other than 0. One pole 32 of the stator 16 has a maximum width of one pole pitch Tp, and the spacing A between two poles 32 of the stator 16 is equivalent to at least one-third the pole pitch Tp.

Between two slots 31, there is an opening through a slot 33 for a coolant medium; for instance, cooling air can flow here. An alternative cooling provision is shown in FIG. 2 as well, all the way to the right. In this example, between two adjacent different-phase coil sides 42 there is a cooling pipe 45 of a fluid cooling system 46, which is disposed between these two coil sides 42 and which carries a coolant fluid 48 in its interior.

Figure 3:
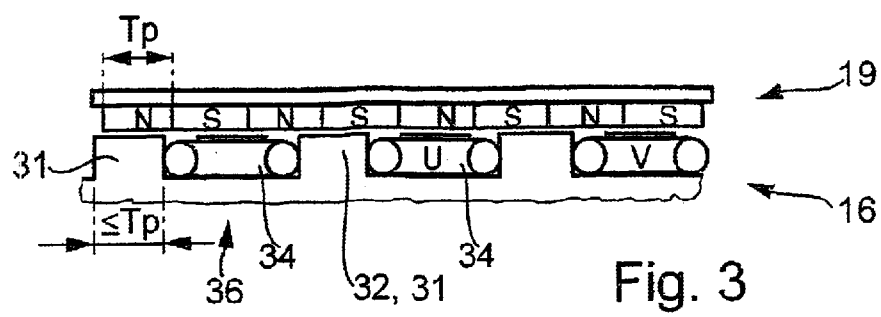
FIG. 3 shows a second exemplary embodiment of the coils in the stator.

In FIG. 3, a second exemplary embodiment of the stator 16 and rotor 19 is shown. In this exemplary embodiment, eight permanent magnets 25 of the rotor and six teeth 31 of the stator 16 each face one another. In a modification of the first exemplary embodiment, however, here only every other tooth 31 carries a coil 34, so that in each slot 33 there is one coil side 42 of a coil 34.

Figure 3A:
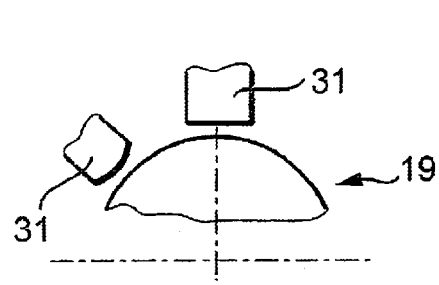
FIG. 3A shows details of the embodiment of the air gap between the rotor and the stator.

In FIG. 3A, a detail of the embodiment of the teeth 31 is shown. In order to obtain the least possible resting moments, it is favorable if the air gap between a tooth 31 and the cylindrical surface of the rotor 19 is widened in the region of the peripheral ends of the tooth 31. In the first exemplary embodiment—on the left-hand side of FIG. 3A—the tooth 31 has a surface curved toward the surface of the rotor 19. As a result, the spacing in the middle of the tooth 31 from the rotor 19 is less than on the lateral ends of the tooth 31. In the second exemplary embodiment of FIG. 3A, the tooth 31 has a straight surface, so that once again the spacing between the tooth 31 and the rotor 19 is at its smallest in the middle of the tooth. The gap between a tooth 31 and the rotor 19 is embodied most favorably whenever the magnetic field in the air gap has a sinusoidal course.

In operation as a motor, permanently excited rotary-field machines are predominantly operated at inverters 22. By suitable connection of bridge valves of the inverter 22, a suitable multi-phase system is made available to the machine 10.

Many different triggering methods exist in this respect. Usually, however, the current is regulated as a function of the rotor position. In field-oriented regulation, the stator current is set such that it generates the maximum moment. This means that in the machine 10, flooding that is perpendicular to the rotor field is brought about. The field-oriented regulation takes place below a maximum output voltage of the inverter 22.

Figure 4:
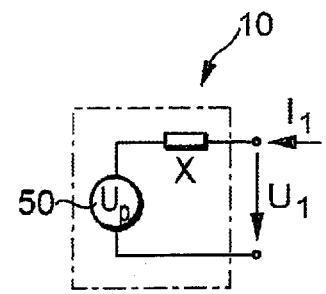
FIG. 4 is a simplified substitute circuit diagram of the electrical machine.

FIG. 4 shows the simplified substitute circuit diagram of the machine 10. The electrical machine 10 is reduced to an inductive dummy resistor X, which is connected in series inside the machine 10 with a voltage source 50 that generates the multi-phase voltage $U_p$. A voltage $U_1$ is equivalent to the terminal voltage, which is established at a current fed in from the inverter 22.

Figure 5:
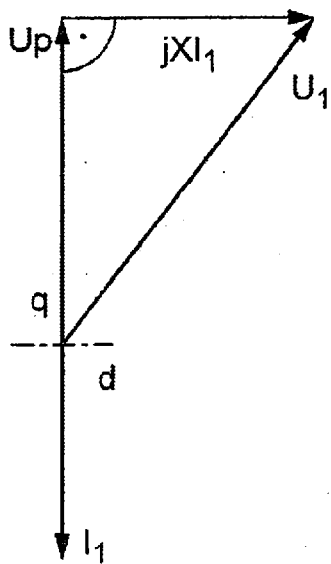
FIG. 5 is a vector diagram for the simplified substitute circuit diagram of the electrical machine.

In FIG. 5, the associated vector diagram for the electrical machine 10 of FIG. 4 is shown; here the illustration is selected to show the generator mode.

The two axes are marked d and q. Of these, d is the longitudinal axis (the axis in the direction of the poles) in the machine, and q is the transverse axis (perpendicular to the d axis).

The inverter can establish only a maximum voltage $U_{1, max}$ at the terminals of the multiphase winding 38. This voltage is specified by a supply voltage of the inverter 22 and by the internal circuitry of the inverter. Since with increasing rpm the voltage $U_p$ generated by the rotor increases linearly in the multiphase winding 38 of the machine, the voltage $U_p$, beyond a certain rpm, reaches the maximum inverter voltage and can no longer achieve the operating mode with a pure transverse current $I_1$ and continue it onto higher rpm levels.

At higher rpm levels, a so-called field attenuation mode is achieved. However, in it an attenuation of the rotor field does not take place; instead, an additional current that acts counter to the rotor field is fed into the stator and accordingly reduces the air gap field between the rotor 19 and the stator 16. The regulation in the field attenuation mode takes place above a maximum output voltage of the inverter 22.

Figure 6:
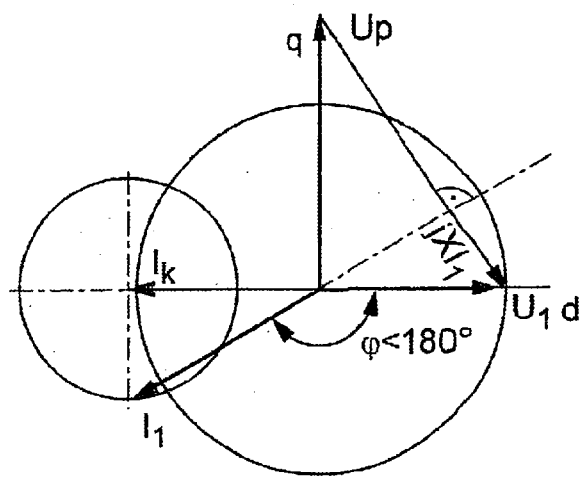
FIG. 6 is a vector diagram for a voltage in the multiphase winding, which is higher than the maximum inverter voltage.

In FIG. 6, the vector diagram is shown for a stator voltage $U_p$ that is greater than the maximum inverter voltage $U_1$. In this operating range, the inverter voltage $U_1$ is adjusted to its maximum value.

The stator current can be thought of as being rotated out of the q axis so far that a stator voltage $U_p$ equivalent to the maximum inverter voltage $U_1$ again results. A stator current (only at Pmax does $I_d=I_k$) in the d axis represents the field attenuation current.

In FIG. 6, the point of maximum power is shown. This power is the limit power of the machine for a given maximum voltage at the multiphase winding 38 and cannot be exceeded.

Figure 7:
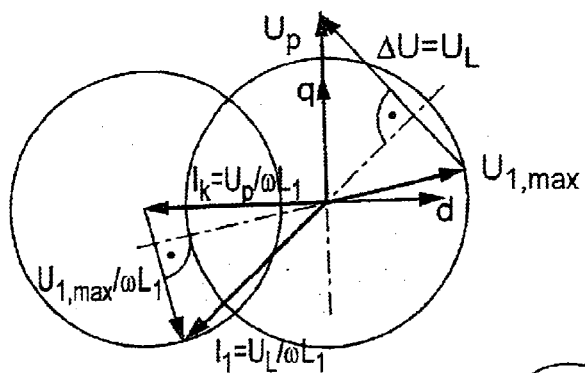
FIG. 7 is a vector diagram for a generalized operating point with lower power than the limit power.

For a generalized operating point of lesser power than the limit power, the vector diagram of FIG. 7 is the result. In it, the dummy resistor X equal to a circuit frequency ω is multiplied by an inductance L of the multiphase winding 38. A voltage difference U between the stator voltage $U_p$ and the maximum inverter voltage $U_{1, max}$ yields the dummy voltage $U_L$, which is the product of the dummy resistance and the current $I_1$.

Figure 8:
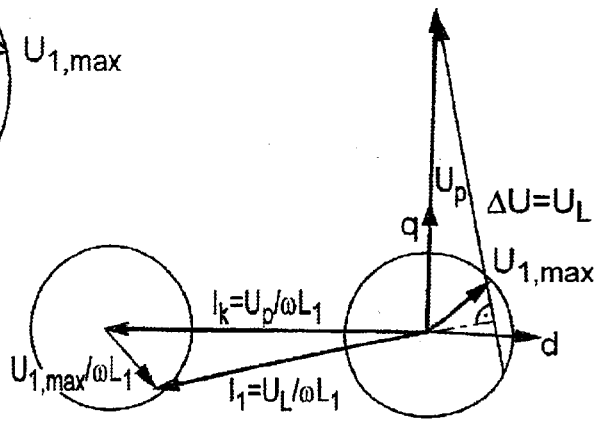
FIG. 8 shows a vector diagram for a voltage in the multiphase winding that is very much higher than the maximum inverter voltage.

At very high rpm levels, the stator voltage $U_p$ of the machine becomes much higher than the maximum inverter voltage $U_{1, max}$; see FIG. 8. The requisite field attenuation current $I_1$ in the d axis then increasingly approaches a short-circuit current $I_k=U_p/X$ of the machine. Thus at very high rpm levels, a longitudinal current is required, which is approximately equivalent to the short-circuit current.

This field attenuation current is present at virtually the same level in the idling mode of the machine 10 as well.

Thus for a wide field attenuation mode, a machine that is short-circuit-proof is needed. This means that the short-circuit current $I_k$ cannot be allowed to cause either magnetic or thermal damage to the machine.

For good field attenuatability, a machine 10 is accordingly needed that has a low short-circuit current $I_k$. If the machine is capable of carrying this current permanently, then a field attenuation up in principle to infinity is possible. Thus the short-circuit current $I_k$ of the machine 10 must be located near its rated current.

Figure 9:
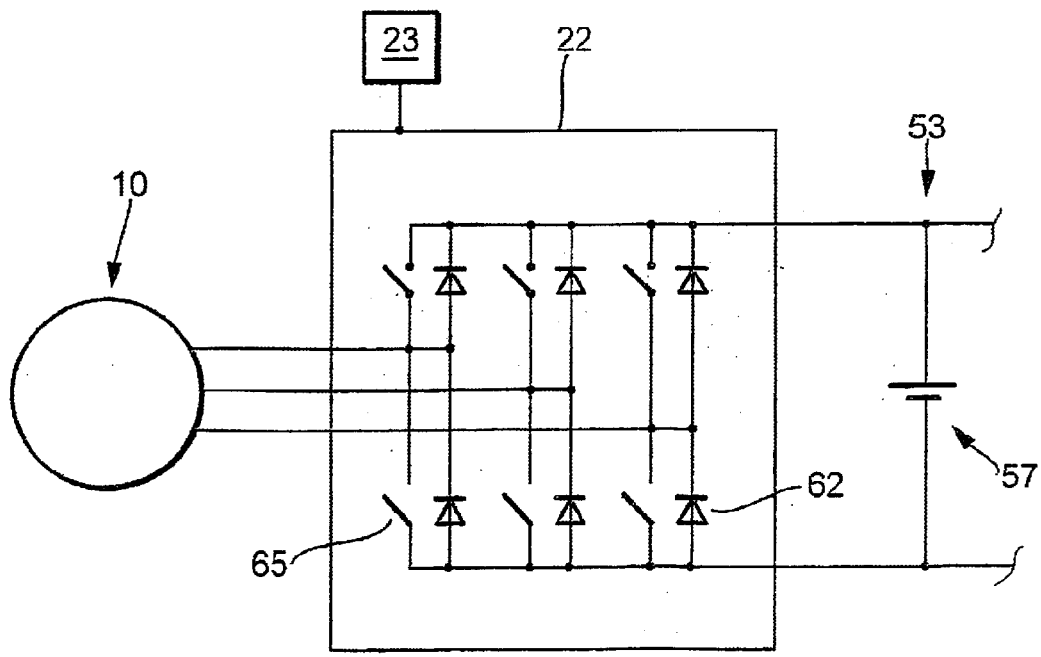
FIG. 9 shows the overall disposition of the electrical machine, which is connected to an intermediate circuit via the inverter.

In permanently excited machines in the field attenuation mode—that is, at high rpm levels—the problem also arises of putting these machines into a safe operating state in the event of failure of the inverter 22. If the inverter 22 is switched off at high rpm levels, then the machine 10, with its high stator voltage, feeds into an intermediate circuit 53 via reverse diodes of the inverter 22; see also FIG. 9.

If the intermediate circuit 53 is supplied from the general power grid, then usually it is unable to absorb the power, and the intermediate circuit voltage exceeds the allowable value, which can lead to the destruction of the inverter. In applications in motor vehicles, the intermediate circuit 53 is embodied by a battery 57. If failure of the inverter 22 occurs in that case, the machine 10, via the reverse diodes, feeds power uncontrollably into the battery (on-board electrical system), where it can cause damage.

The consequence is a sharp rise in an intermediate circuit voltage in the inverter 22.

If the feedback via the diodes 62 is suppressed, however, then the stator voltage in the machine 10 increases to the value of the pole wheel voltage. This value can assume impermissibly high values and can penetrate the insulation of the machine. In a machine that has a low short-circuit current $I_k$ and that can carry this current permanently, the possibility exists of short-circuiting the machine via the valves 65. Thus an impermissible voltage cannot become established at the terminals of the multiphase winding 38 of the machine 10, and no power that threatens the inverter 22 is fed back into the intermediate circuit. However, to achieve this, the valves must be capable of carrying the short-circuit current $I_k$ of the machine, which is no problem if the short-circuit current is within the range of the rated current of the machine.

What is claimed is:

1. An electrical machine, in particular a starter-generator, having a permanent-magnetically excitable rotor (19) and a stator (16) the stator (16) carrying a multiphase winding (38), having an inverter (22) which is variable by means of a regulating or control device (23) and by which the stator (16) can be operated in the field attenuation mode, characterized in that the stator (16) has a number of poles equivalent to n times the number of phases of the multiphase winding (38) in the stator (16), and each phase winding (36) comprises at least one coil (34), and all the coils (34) of the multiphase winding (38) are disposed side by side in the stator (16), and the rotor (19) has a number of poles equivalent to n times the number 4, one pole (32) of the stator (16) having a maximum width of a pole pitch (Tp), and the spacing (A) of two poles (32) of the stator (16) being equivalent to at least one-third the pole pitch (Tp).

2. The electrical machine of claim 1, characterized in that below a maximum output voltage of the inverter (22), the stator (16) can be regulated in field-oriented fashion.

3. The electrical machine of claim 1, characterized in that above a maximum output voltage of the inverter (22), the stator can be operated in the field attenuation mode.

4. The electrical machine of claim 1, characterized in that two coil sides (42) of coils (34) of a different phase are each disposed in one slot (33).

5. The electrical machine of claim 1, characterized in that one coil side (42) of one coil (34) is disposed in each slot (33).

6. The electrical machine of claim 1, characterized in that a coolant medium can be passed through at least one slot (33).

7. The electrical machine of claim 1, characterized in that an air gap (28) between the rotor (19) and one tooth (31) of the stator is widened in the direction of the peripheral ends of the tooth (31).

8. An electrical machine, in particular a starter-generator, having a permanent-magnetically excitable rotor (19) and a stator (16) the stator (16) carrying a multiphase winding (38), having an inverter (22) which is variable by means of a regulating or control device (23) and by which the stator (16) can be operated in the field attenuation mode, characterized in that the stator (16) has a number of poles equivalent to n times the number of phases of the multiphase winding (38) in the stator (16), and each phase winding (36) comprises at least one coil (34), and all the coils (34) of the multiphase winding (38) are disposed side by side in the stator (16), and the rotor (19) has a number of poles equivalent to n times the number 4, one pole (32) of the stator (16) having a maximum width of a pole pitch (Tp), and the spacing (A) of two poles (32) of the stator (16) being equivalent to at least one-third the pole pitch (Tp), wherein below a maximum output voltage of the inverter (22) the stator (16) is regulatable in field-oriented fashion, while above a maximum output voltage of the Inverter (22) the stator is operatable in the field attenuation mode, wherein the coils (34) are arranged so that two coil sides (42) of the coil (34) of a different phase are each disposed in one slot (33) or one coil side (42) of one coil (34) is disposed in each slot (33), and wherein a cooling medium is passed through at least one slot (32), and wherein an air gap (28) between the rotor (19).

* * * * *